(12) United States Patent
Lee et al.

(10) Patent No.: US 11,962,239 B2
(45) Date of Patent: Apr. 16, 2024

(54) CONTROL CIRCUIT OF POWER CONVERTER AND CONTROL METHOD THEREOF

(71) Applicant: uPI Semiconductor Corp., Hsinchu County (TW)

(72) Inventors: Yun-Kuo Lee, Hsinchu County (TW); Wei-Hsiang Wang, Hsinchu County (TW); Yen-Chih Lin, Hsinchu County (TW); Wei-Hsiu Hung, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 28 days.

(21) Appl. No.: 17/946,036

(22) Filed: Sep. 16, 2022

(65) Prior Publication Data

US 2023/0138767 A1   May 4, 2023

(30) Foreign Application Priority Data

Oct. 28, 2021 (CN) .......................... 202111264103.5

(51) Int. Cl.
  *H02M 3/157* (2006.01)
  *H02M 1/00* (2006.01)

(52) U.S. Cl.
  CPC ......... *H02M 3/157* (2013.01); *H02M 1/0019* (2021.05); *H02M 1/0025* (2021.05)

(58) Field of Classification Search
  CPC ............. H02M 1/0012; H02M 1/0019; H02M 1/0025; H02M 3/1566; H02M 3/157
  See application file for complete search history.

(56) References Cited

U.S. PATENT DOCUMENTS

| | | |
|---|---|---|
| 6,850,046 B2 | 2/2005 | Chapuis |
| 7,239,115 B2 | 7/2007 | Chapuis et al. |
| 7,245,512 B2 | 7/2007 | Leung et al. |
| 7,554,310 B2 | 6/2009 | Chapuis et al. |
| 7,565,559 B2 | 7/2009 | Chapuis |

(Continued)

FOREIGN PATENT DOCUMENTS

CN   102570814   7/2012

*Primary Examiner* — Fred E Finch, III
(74) *Attorney, Agent, or Firm* — JCIPRNET

(57) ABSTRACT

A control circuit of a power converter and a control method thereof are provided. The control circuit includes an error amplifier, a controller, a digital filter, and a digital pulse width signal modulator. The error amplifying circuit is coupled to an output terminal of the power converter and provides a digital error signal. The controller provides a first working parameter corresponding to the first external control command when receiving a first external control command. The digital filter generates a current digital compensation value. The digital pulse width signal modulator generates a pulse width modulation signal. The controller provides a second working parameter corresponding to the second external control command when receiving a second external control command. The controller calculates a transition value according to the second working parameter and the current digital compensation value. The controller provides the second working parameter and the transition value to the digital filter.

8 Claims, 6 Drawing Sheets

(56) References Cited

U.S. PATENT DOCUMENTS

| | | | |
|---|---|---|---|
| 7,586,767 B1 * | 9/2009 | Prodic | H02M 3/158 |
| | | | 700/297 |
| 7,630,779 B2 | 12/2009 | Kelly | |
| 7,748,266 B2 | 7/2010 | Evrard et al. | |
| 8,004,259 B2 | 8/2011 | Soenen et al. | |
| 8,143,874 B2 | 3/2012 | Templeton | |
| 8,373,402 B2 | 2/2013 | Peng | |
| 9,923,450 B2 | 3/2018 | Karlsson et al. | |
| 10,270,329 B2 | 4/2019 | Karlsson et al. | |
| 2012/0194157 A1 * | 8/2012 | Kawashima | H02M 3/157 |
| | | | 323/283 |
| 2016/0132084 A1 * | 5/2016 | Solki | H02M 3/157 |
| | | | 713/320 |
| 2017/0149335 A1 * | 5/2017 | Morroni | H02M 3/156 |
| 2020/0112249 A1 * | 4/2020 | Oettinger | H02M 3/157 |
| 2020/0195141 A1 * | 6/2020 | Schwabe | H03K 7/08 |

* cited by examiner

CONTROL CIRCUIT OF POWER CONVERTER AND CONTROL METHOD THEREOF

CROSS-REFERENCE TO RELATED APPLICATION

This application claims the priority benefit of China application serial no. 202111264103.5, filed on Oct. 28, 2021. The entirety of the above-mentioned patent application is hereby incorporated by reference herein and made a part of this specification.

BACKGROUND

Technical Field

The disclosure relates to a power converter, and in particular to a control circuit of the power converter and a control method thereof.

Description of Related Art

For the conventional power converter employing digital filter, it is necessary to make filter parameter changes when the output power requirements change. However, when the filter parameters are directly replaced, it leads to significant difference in filter output value. This further results in output control signal level variation and power converter failing to maintain stable output voltage.

SUMMARY

The disclosure provides a control circuit of a power converter and a control method thereof, which can control the power converter to maintain a stable power signal output.

According to an embodiment of the disclosure, a control circuit of a power converter of the disclosure includes an error amplifying circuit, a controller, a digital filter, and a digital pulse width signal modulator. The error amplifying circuit is coupled to an output terminal of the power converter and provides a digital error signal. The controller stores multiple working parameters. When the controller receives a first external control command, the controller provides a first working parameter corresponding to the first external control command. The digital filter is coupled to the controller and the error amplifying circuit, and generates a current digital compensation value according to the first working parameter and the digital error signal. The digital pulse width signal modulator is coupled to the digital filter and generates a pulse width modulation signal according to the current digital compensation value. When the controller receives a second external control command, the controller provides a second working parameter corresponding to the second external control command. The controller calculates a transition value according to the second working parameter and the current digital compensation value, and the controller then provides the second working parameter and the transition value to the digital filter.

In an embodiment, when the controller provides the second working parameter and the transition value to the digital filter, the digital filter outputs the current digital compensation value.

In an embodiment, the error amplifying circuit includes an error amplifier and an analog-to-digital converter. The error amplifier is coupled to a reference voltage and the output terminal of the power converter, and the analog-to-digital converter is coupled between the error amplifier and the digital filter.

In an embodiment, the controller includes a decoder, a memory, and a computing unit. The decoder receives the second external control command and generates an indication signal according to the second external control command. The memory is coupled to the decoder and the digital filter, and stores the working parameters. The memory outputs one of the working parameters as the second working parameter according to the indication signal. The computing unit is coupled to the memory and the digital filter, and calculates the transition value according to the second working parameter and the current digital compensation value.

In an embodiment, the digital filter includes a register and a computing circuit. The register is coupled to the controller and stores the transition value. The computing circuit is coupled to the register and the controller, and generates the current digital compensation value according to the second working parameter and the transition value.

According to an embodiment of the disclosure, a control method of a power converter of the disclosure includes the following steps. A digital error signal is provided by an error amplifying circuit. When a controller receives a first external control command, a first working parameter corresponding to the first external control command is provided by the controller among the multiple working parameters it stores. A current digital compensation value is generated by a digital filter according to the first working parameter and the digital error signal. A pulse width modulation signal is generated by a digital pulse width signal modulator according to the current digital compensation value. When the controller receives a second external control command, a second working parameter corresponding to the second external control command is provided by the controller. A transition value is calculated by the controller based on the second working parameter and the current digital compensation value. The second working parameter and the transition value are provided by the controller to the digital filter.

In an embodiment, when the controller provides the second working parameter and the transition value to the digital filter for computation, the digital filter outputs the current digital compensation value.

In an embodiment, the error amplifying circuit includes an error amplifier and an analog-to-digital converter. The error amplifier is coupled to a reference voltage and an output terminal of the power converter, and the analog-to-digital converter is coupled between the error amplifier and the digital filter.

In an embodiment, the controller includes a decoder, a memory, and a computing unit. The steps for providing the second working parameter corresponding to the second external control command include the following. The second external control command is received by the decoder, and an indication signal is generated according to the second external control command. One of the working parameters is chosen to be output from the memory as the second working parameter according to the indication signal. The step of calculating the transition value includes the following. The transition value is calculated by the computing unit according to the second working parameter and the current digital compensation value.

In an embodiment, the digital filter includes a register and a computing circuit, and the register stores the transition value. The control method further includes the following. The current digital compensation value is being generated by the computing circuit according to the second working parameter and the transition value.

Based on the above, the control circuit of the power converter and the control method thereof of the disclosure can automatically generate the matching transition value according to the working parameters corresponding to the external control commands. The digital filter can therefore keep outputting the same digital compensation value, which is based on the transition value, to the digital pulse width signal modulator, and the digital pulse width signal modulator keep outputting the same pulse width modulation signal.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
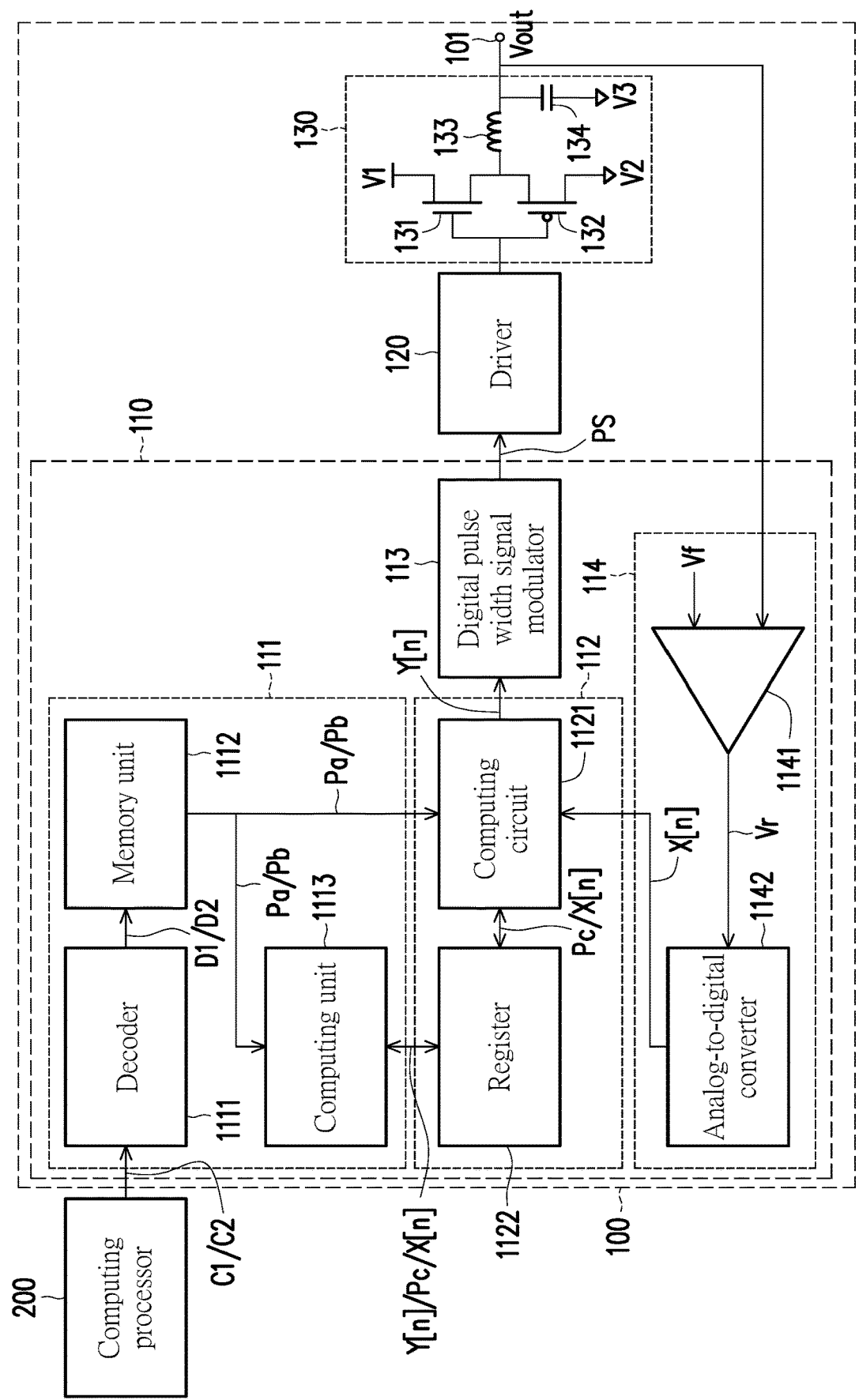
FIG. 1 is a schematic circuit diagram of a control circuit of a power converter according to an embodiment of the disclosure.

Reference will now be made in detail to the exemplary embodiments of the disclosure, examples of which are illustrated in the drawings. Wherever possible, the same reference numerals are used in the drawings and the description to refer to the same or similar parts.

FIG. 1 is a schematic circuit diagram of a control circuit of a power converter according to an embodiment of the disclosure. Referring to FIG. 1, a power converter 100 includes a control circuit 110, a driver 120, an output circuit 130, and an output terminal 101. The output circuit 130 includes transistors 131 and 132, an inductor 133, and a capacitor 134. The control circuit 110 includes a controller 111, a digital filter 112, a digital pulse width signal modulator 113, and an error amplifying circuit 114.

In the embodiment, the error amplifying circuit 114 is coupled to the output terminal 101 of the power converter 100. The digital filter 112 is coupled to the controller 111, the digital pulse width signal modulator 113, and the error amplifying circuit 114. The digital pulse width signal modulator 113 is coupled to the driver 120. The driver 120 is coupled to control terminals of the transistor 131 and the transistor 132.

A first terminal of the transistor 131 is coupled to a first voltage V1. The first voltage V1, for example, has a high voltage level. A second terminal of the transistor 131 is coupled to a first terminal of the transistor 132 and a first terminal of the inductor 133. The first terminal of the transistor 132 is coupled to a second terminal of the transistor 131 and the first terminal of the inductor 133. A second terminal of the transistor 132 is coupled to a second voltage V2. The second voltage V2, for example, has a low voltage level or is grounded.

In the embodiment, the transistor 131 may be an NMOS transistor, and the transistor 132 may be a PMOS transistor. A second terminal of the inductor 133 is coupled to the output terminal 101 of the power converter 100. A first terminal of the capacitor 134 is coupled to the second terminal of the inductor 133 and the output terminal 101, and a second terminal of the capacitor 134 is coupled to a third voltage V3. The third voltage V3, for example, has a low voltage level or is grounded.

In the embodiment, the controller 111 includes a decoder 1111, a memory 1112, and a computing unit 1113. The digital filter 112 includes a computing circuit 1121 and a register 1122. The error amplifying circuit 114 includes an error amplifier 1141 and an analog-to-digital converter 1142. The decoder 1111 is coupled to an external computing processor 200 and the memory 1112. The computing processor 200 may be a central processing unit (CPU), a graphics processing unit (GPU), or a current level comparator that may be fabricated with or external to control circuit 110.

The decoder 1111 may receive an external control command C1/C2 provided by the computing processor 200, and generate a corresponding indication signal to the memory 1112 according to the external control command C1/C2. The memory 1112 is further coupled to the computing unit 1113 and the computing circuit 1121 of the digital filter 112, and stores multiple working parameters. The computing unit 1113 is further coupled to the register 1122 of the digital filter 112. In the embodiment, the computing circuit 1121 is further coupled to the register 1122 and the digital pulse width signal modulator 113.

In the embodiment, a first input terminal of the error amplifier 1141 is coupled to the output terminal 101 of the power converter 100, and a second input terminal of the error amplifier 1141 is coupled to a reference voltage Vf. An output terminal of the error amplifier 1141 is coupled to the analog-to-digital converter 1142. The analog-to-digital converter 1142 is further coupled to the computing circuit 1121.

In the embodiment, the error amplifier 1141 may generate an analog error signal Vr according to an output voltage Vout and the reference voltage Vf, so that the output terminal of the error amplifier 1141 may provide the analog error signal Vr to the analog-to-digital converter 1142. The analog-to-digital converter 1142 may convert the analog error signal to output a digital error signal X[n] to the computing circuit 1121.

When the computing processor 200 outputs the first external control command C1 to the decoder 1111, the decoder 1111 generates a first indication signal D1 to the memory 1112 according to the first external control command C1. The memory 1112 outputs a first working parameter Pa to the computing unit 1113 and the computing circuit 1121 according to the first indication signal D1. The computing circuit 1121 outputs a current digital compensation value Y[n] to the digital pulse width signal modulator 113 and the register 1122 according to the first working parameter Pa and the digital error signal X[n]. The digital pulse width signal modulator 113 outputs a pulse width modulation signal PS to the driver 120 according to the current digital compensation value Y[n]. For this, the driver 120 may control the output circuit 130 according to the pulse width modulation signal PS to generate the output voltage Vout to the output terminal 101 of the power converter 100.

Next, when the power requirement of a load device coupled to the output terminal 101 of the power converter 100 changes, the load state changes, or a power signal output by the power converter 100 changes, the computing processor 200 may respond by outputting the second external control command C2 to the decoder 1111. The decoder 1111 then generates a second indication signal D2 to the memory 1112 according to the second external control command C2.

The memory 1112 outputs a second working parameter Pb to the computing unit 1113 and the computing circuit 1121 according to the second indication signal D2. The computing unit 1113 calculates a transition value Pc according to the second working parameter Pb and the current digital compensation value Y[n] provided by the register 1122, and provides the transition value Pc to the register 1122 for storage. For this, the computing circuit 1121 may keep generating identical digital compensation value Y[n] according to the digital error signal X[n], the second working parameter Pb, and the transition value Pc.

Therefore, the control circuit 110 of the power converter 100 can effectively maintain the output voltage Vout of the power converter 100 when the working parameter of the digital 185 filter 112 changes, resulting in a stable power output.

Figure 2:
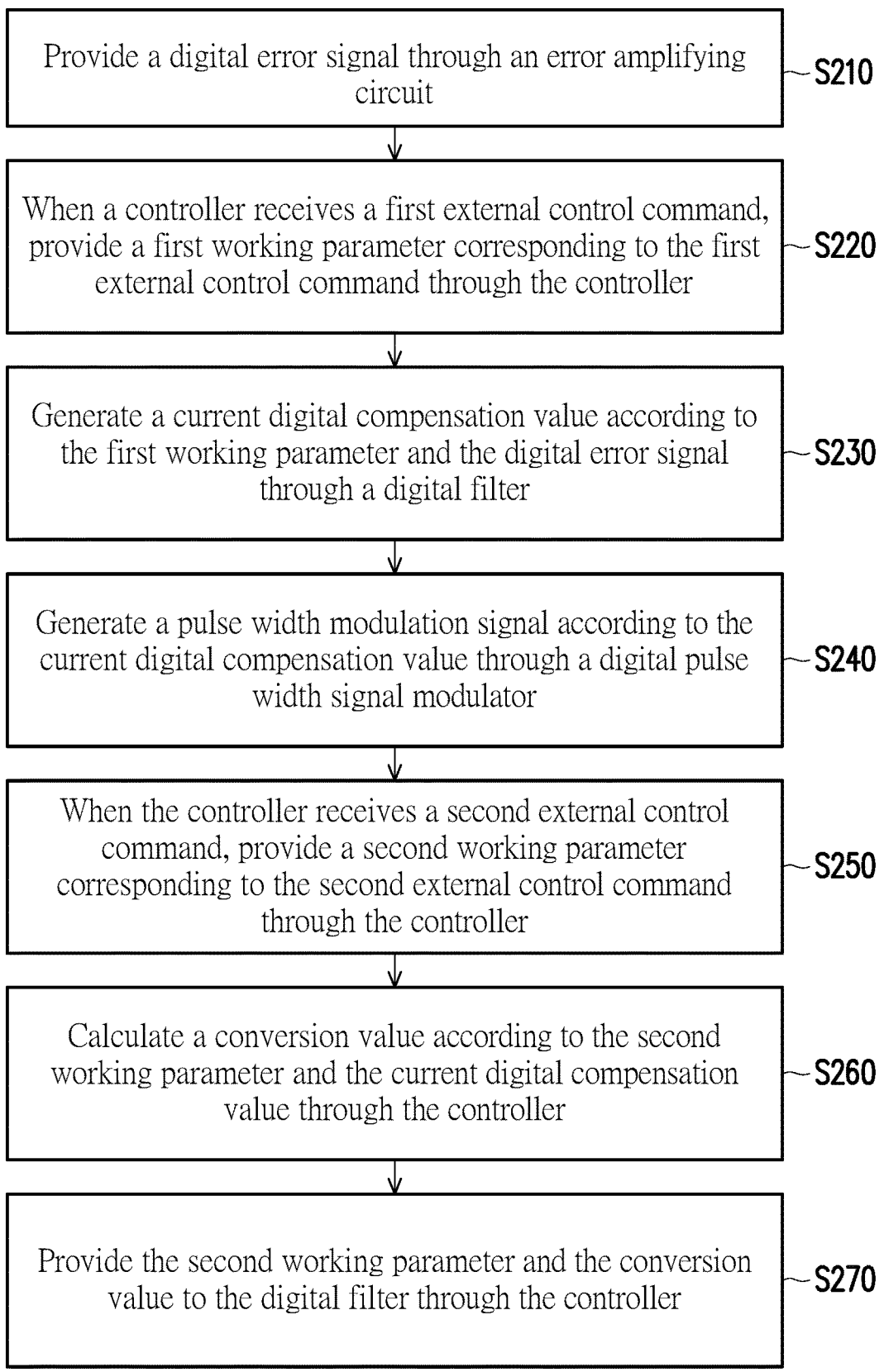
FIG. 2 is a flowchart of a control method of a power converter according to an embodiment of the disclosure.

FIG. 2 is a flowchart of a control method of a power converter according to an embodiment of the disclosure. Referring to FIG. 1 and FIG. 2, the control circuit 110 may execute Steps S210 to S270 to implement a control function thereof.

In Step S210, the error amplifying circuit 114 provides the digital error signal X[n]. In Step S220, when the controller 111 receives the first external control command C1, the controller 111 provides the first working parameter Pa corresponding to the first external control command C1. In Step S230, the digital filter 112 generates the current digital compensation value Y[n] according to the first working parameter and the digital error signal X[n]. In Step S240, the digital pulse width signal modulator 113 generates the pulse width modulation signal PS according to the current digital compensation value Y[n]. In Step S250, when the controller 111 receives the second external control command C2, the controller 111 provides the second working parameter Pb corresponding to the second external control command C2. In Step S260, the controller 111 calculates the transition value Pc according to the second working parameter Pb and the current digital compensation value. In Step S270, the controller 111 provides the second working parameter Pb and the transition value Pc to the digital filter 112.

For this, the digital filter 112 may keep generating the current digital compensation value Y[n] according to the second working parameter and the transition value Pc. That is, when the controller 111 provides the second working parameter and the transition value Pc to the digital filter 112 for computation, the digital filter 112 still outputs the identical digital compensation value Y[n].

Therefore, when the power requirement of the load device coupled to the output terminal 101 of the power converter 100 changes, the load state changes, or the power signal output by the power converter 100 changes (for example, the number of output phases changes such that an equivalent output inductance value changes), it is necessary to switch the working parameters in the digital filter 112 to respond to the changes. When the changes occur, the controller 111 changes from receiving the first external control command C1 to receiving the second external control command C2, so that the control circuit 110 of the power converter 100 can maintain the output voltage Vout of the power converter 100 steadily.

Figure 3:
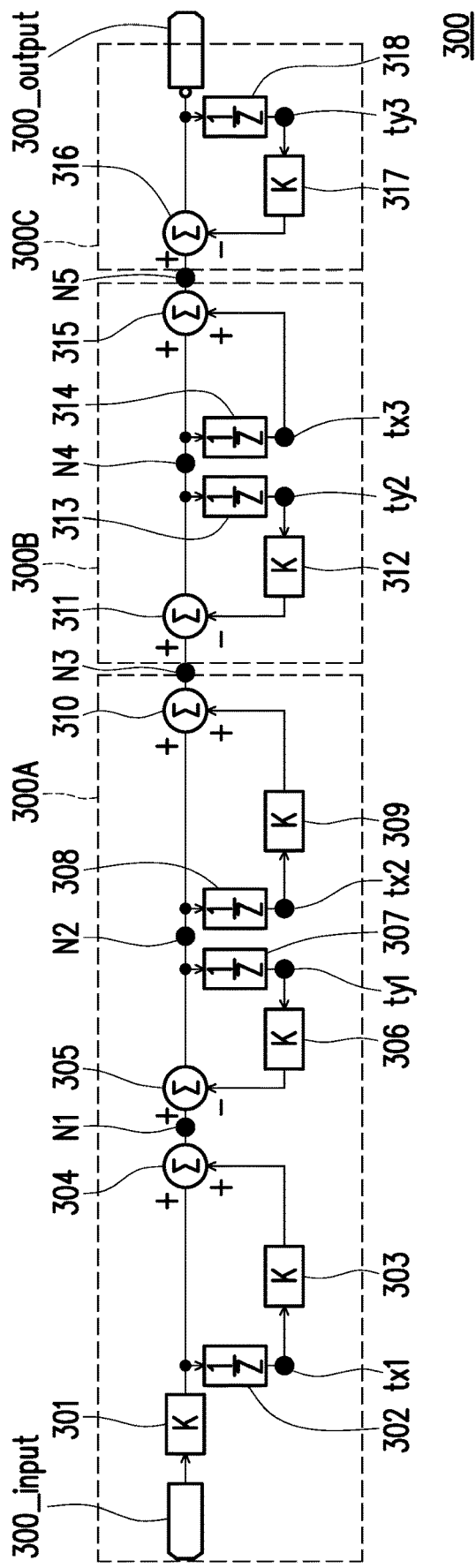
FIG. 3 is a schematic diagram of an equivalent digital circuit of a digital filter according to an embodiment of the disclosure.

FIG. 3 is a schematic diagram of an equivalent digital circuit of a digital filter according to an embodiment of the disclosure. Referring to FIG. 1 and FIG. 3, the digital filter 112 may be a multi-order filter with a cascade architecture, and the computing circuit 1121 may be implemented in a Type I series cascade architecture, which is shown as digital circuit 300 in FIG. 3. The digital circuit 300 of the computing circuit 1121 may include three sub-computing blocks 300A, 300B, and 300C, but the disclosure is not limited thereto.

In an embodiment, the computing circuit 1121 may further be embodied in other equivalent circuit forms. In the embodiment, the sub-computing block 300A may include an input node 300_input, register nodes N1, N2, N3, tx1, tx2, and ty1, and operands 301 to 310. The sub-computing block 300B may include register nodes N4, N5, ty2, and tx3, and operands 311 to 315. The sub-computing block 300C may include an output node 300_output, a register node ty3, and operands 316 to 318.

It should be noted first that the register nodes N1 to N5, tx1 to tx3, and ty1 to ty3 may indicate that computing values thereof are respectively stored by corresponding register units, and the operands 301 to 318 may indicate that computing functions thereof are respectively implemented by a corresponding unit time delay, multiplier, adder, or subtractor.

As shown in FIG. 3, in the sub-computing block 300A (the first stage), the operand 301 is coupled to the input node 300_input to receive an input value Din of the digital error signal X[n], and the operand 301 is a multiplier (with a multiplier value of K1). The operand 302 is coupled between an output of the operand 301 and the register node tx1 (storing a transition value CX1), and the operand 302 is a unit time delay. The operand 303 is coupled between the register node tx1 and an input of the operand 304, the operand 303 is a multiplier (with a multiplier value of K2), and the operand 304 is an adder.

The operand 304 is coupled to the output of the operand 301 and an output of the operand 303, and outputs a computing result to the register node N1 (storing a node value A1). The operand 305 is coupled to the register node N1, and the operand 305 is a subtractor. The operand 305 is coupled to the register node N1 and an output of the operand 306, and outputs a computing result to the register node N2 (storing a node value A2). The operand 306 is coupled between the operand 305 and the register node ty1 (storing a transition value CY1), and the operand 306 is a multiplier (with a multiplier value of K3). The operand 307 is coupled between the register node ty1 and an output of the operand 305, and the operand 307 is a unit time delay.

The register node N2 is coupled to the output of the operand 305. The operand 308 is coupled between the register node N2 and the register node tx2 (storing a transition value CX2), and the operand 308 is a unit time delay. The operand 309 is coupled between the register node tx2 and the operand 310, the operand 309 is a multiplier (with a multiplier value of K4), and the operand 310 is an adder. The operand 310 is coupled to the register node N2 and an output of the 250 operand 309, and outputs a computing result to the register node N3 (storing a node value A3).

Therefore, based on the above equivalent digital circuit architecture, in the case where the system is in a stable state (the influence of the unit time delay may be ignored), algorithms of Equation (1) to Equation (6) below may be implemented.

$$A1=CX1*K2+Din*K1 \quad \text{Equation (1)}$$

$$A2=A1-CY1*K3 \quad \text{Equation (2)}$$

$$A3=A2+CX2*K4 \quad \text{Equation (3)}$$

$$A1=CX1*K2+Din*K1 \quad \text{Equation (4)}$$

$$CX2=A2 \quad \text{Equation (5)}$$

$$CY1=A2 \quad \text{Equation (6)}$$

In the sub-computing block 300B (the second stage), the operand 311 is coupled to the register node N3, and the operand 311 is a subtractor. The operand 311 is coupled to the register node N3 and an output of the operand 312, and outputs a computing result to the register node N4 (storing a node value A4). The operand 312 is coupled between the operand 311 and the register node ty2 (storing a transition value CY2), and the operand 312 is a multiplier (with a multiplier 265 value of K5).

The operand 313 is coupled between the register node ty2 and an output of the operand 311, and the operand 313 is a unit time delay. The register node N4 is coupled to the output of the operand 311. The operand 314 is coupled between the register node N4 and the register node tx3 (storing a transition value CX3), and the operand 314 is a unit time delay. The operand 315 is coupled to the register node N4 and the register node tx3, and outputs a computing result to the register node N5 (storing a node value A5), and the operand 315 is an adder.

Therefore, based on the above equivalent digital circuit architecture, in the case where the system is in the stable state (the influence of the unit time delay may be ignored), algorithms of Equation (7) to Equation (10) below may be implemented.

$$A4=A3-CY2*K5 \quad \text{Equation (7)}$$

$$A5=A4-CX3 \quad \text{Equation (8)}$$

$$CX3=A4 \quad \text{Equation (9)}$$

$$CY2=A4 \quad \text{Equation (10)}$$

In the sub-computing block 300C (the third stage), the operand 316 is coupled to the register node N5, and the operand 316 is a subtractor. The operand 316 is coupled to the register node N5 and the output node 300_output to output a value Dout as the current digital compensation value Y[n]. The operand 317 is coupled between the operand 316 and the register node ty3 (storing a transition value CY3), and the operand 317 is a multiplier (with a multiplier value of K6). The operand 318 is coupled between the register node ty3 and the output of the operand 316, and the operand 318 is a unit time delay.

Therefore, based on the above equivalent digital circuit architecture, in the case where the system is in the stable state (the influence of the unit time delay may be ignored), algorithms of Equation (11) and Equation (12) may be implemented.

$$Dout=A5-CY3*K6 \quad \text{Equation (11)}$$

$$CY3=Dout \quad \text{Equation (12)}$$

When the controller 111 is switching coefficients (for example, switching the multiplier values K3 to K6 to new multiplier values K3' to K6') in response to changes in the control command, it is necessary for the controller to make following calculation to maintain the same output value Dout as the current digital compensation value Y[n]. For the sub-computing block 300C, the controller 111 may execute algorithms of Equation (13) and Equation (14) below to obtain the new transition value CY3' and a new node value A5'.

$$CY3'=Dout \quad \text{Equation (13)}$$

$$A5'=Dout+CY3'*K6' \quad \text{Equation (14)}$$

For the sub-computing block 300B, the controller 111 may execute algorithms of Equation (15) to Equation (18) below to obtain the new transition values CX3' and CY2' and new node values A4' and A3'.

$$A4'=A5'/2 \quad \text{Equation (15)}$$

$$CX3'=A4'=(Dout+CY3'*K6')/2=Dout*(1+k6')/2 \quad \text{Equation (16)}$$

$$CY2'=A4' \quad \text{Equation (17)}$$

$$A3'=A4'+CY2'*K5' \quad \text{Equation (18)}$$

For the sub-computing block 300A, the controller 111 may execute algorithms of Equation (19) to Equation (22) to obtain the new transition values CX2' and CY1' and new node values A2' and A1'.

$$A2'=A3'/(1+K4') \quad \text{Equation (19)}$$

$$CX2'=A2'=Dout*(1+K6')*(1+K5')/(2*(1+K4')) \quad \text{Equation (20)}$$

$$CY1'=A2' \quad \text{Equation (21)}$$

$$A1'=A2'+CY1'*K3' \quad \text{Equation (22)}$$

In other words, when the decoder 1111 of the controller 111 receives the second external control command C2, the decoder 1111 may output the corresponding second indication signal D2 to the memory 1112. The memory 1112 may output the second working parameter Pb to the computing unit 1113 according to the second indication signal D2, and the second working parameter Pb includes the new multiplier values K3' to K6'. The computing unit 1113 may then execute Equation (13) to Equation (22) above with the current digital compensation value Y[n] to generate a new transition value Pc to the digital filter 112. The new transition value Pc includes the new transition values CX2', CX3', CY1', CY2', and CY3'. In this way, the computing circuit 1121 may keep generating the same digital compensation value Y[n].

Figure 4:
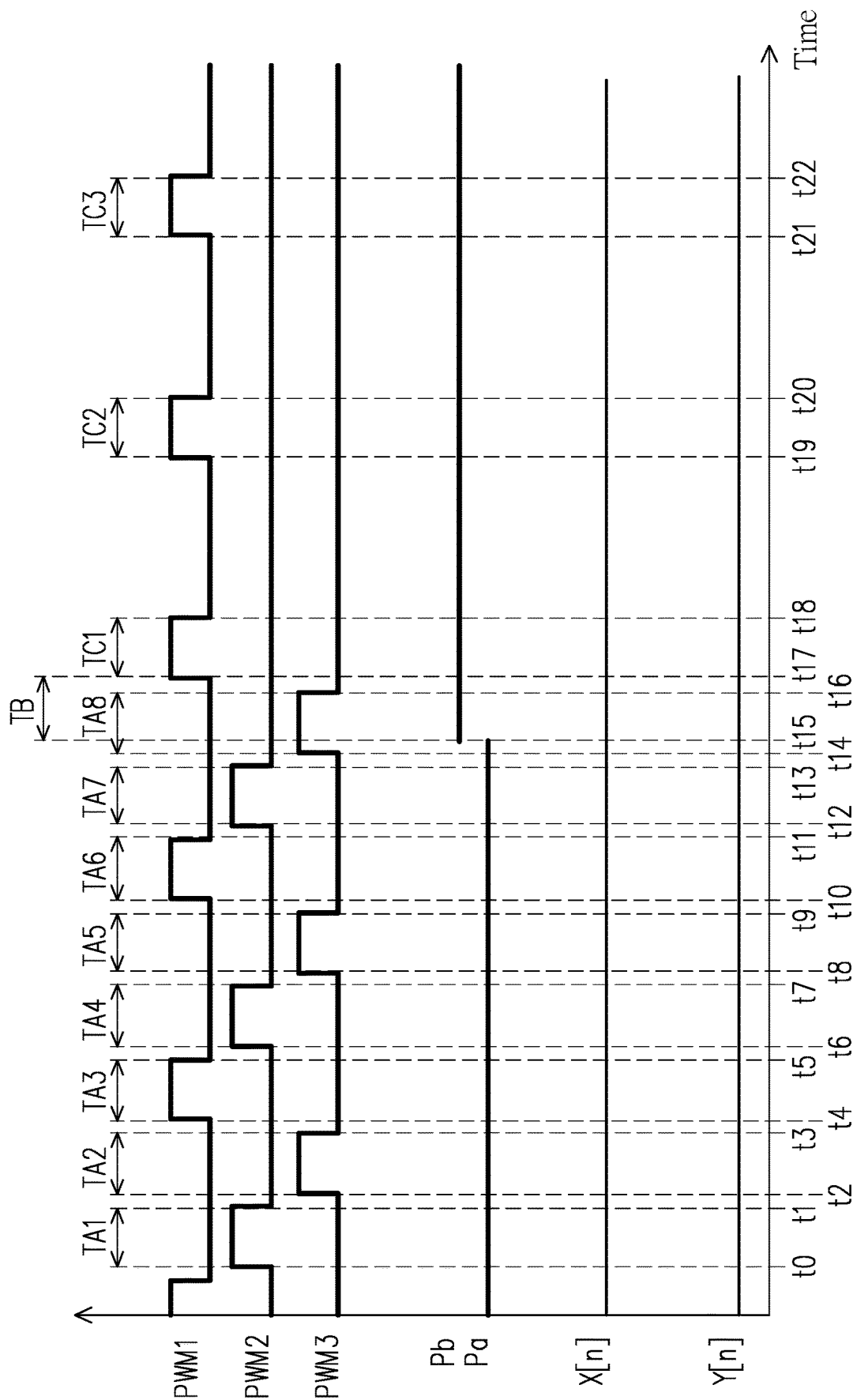
FIG. 4 is a schematic diagram of changes in signal and value switching according to an embodiment of the disclosure.

FIG. 4 is a schematic diagram of changes in signal and value switching according to an embodiment of the disclosure. Referring to FIG. 1 and FIG. 4, for example, it is assumed that the power converter 100 may output a power signal with a three-phase configuration. In this regard, between times t0 and t15, the controller 111 receives the first external control command C1, and the memory 1112 continuously outputs the first working parameter Pa to the digital filter 112.

The computing circuit 1121 of the digital filter 112 may respectively perform computations during periods TA1 to TA8 of times t0 to t1, t2 to t3, t4 to t5, t6 to t7, t8 to t9, t10 to t11, t12 to t13, and t14 to t16 to continuously output the digital compensation value Y[n], and the analog-to-digital converter 1142 may continuously generate the digital error signal X[n]. Therefore, the digital pulse width signal modulator 113 of the control circuit 110 may output a pulse width modulation signal PWM1 as shown in FIG. 4, and two other digital pulse width signal modulator 113 of the control circuit 110 may further output pulse width modulation signals PWM2 and PWM3 as shown in FIG. 4.

It is assumed that the power converter 100 intends to switch to outputting a power signal with a single-phase configuration at a time t17. That is, the pulse width modulation signals PWM2 and PWM3 output by the two digital pulse width signal modulator 113 of the control circuit 110 stop changing, and the digital pulse width signal modulator 113 of the control circuit 110 keeps outputting the same switching pulse width modulation signal PWM1. In this regard, at a time t15, the controller 111 receives the second external control command C2, and the memory 1112 switches to outputting the second working parameter Pb to the digital filter 112. The computing unit 1113 may perform computations during the times t15 to t17 to generate the transition value Pc to the digital filter 112.

In this way, the computing circuit 1121 of the digital filter 112 may perform computations during a period TC1 of times t17 to t18 to keep outputting the digital compensation value Y[n], and the analog-to-digital converter 1142 may continuously generate the digital error signal X[n]. In addition, the computing circuit 1121 of the digital filter 112 may perform computations during periods TC2 and TC3 of times t19 to t20 and t21 to t22 to keep outputting the digital compensation value Y[n].

Figure 5:
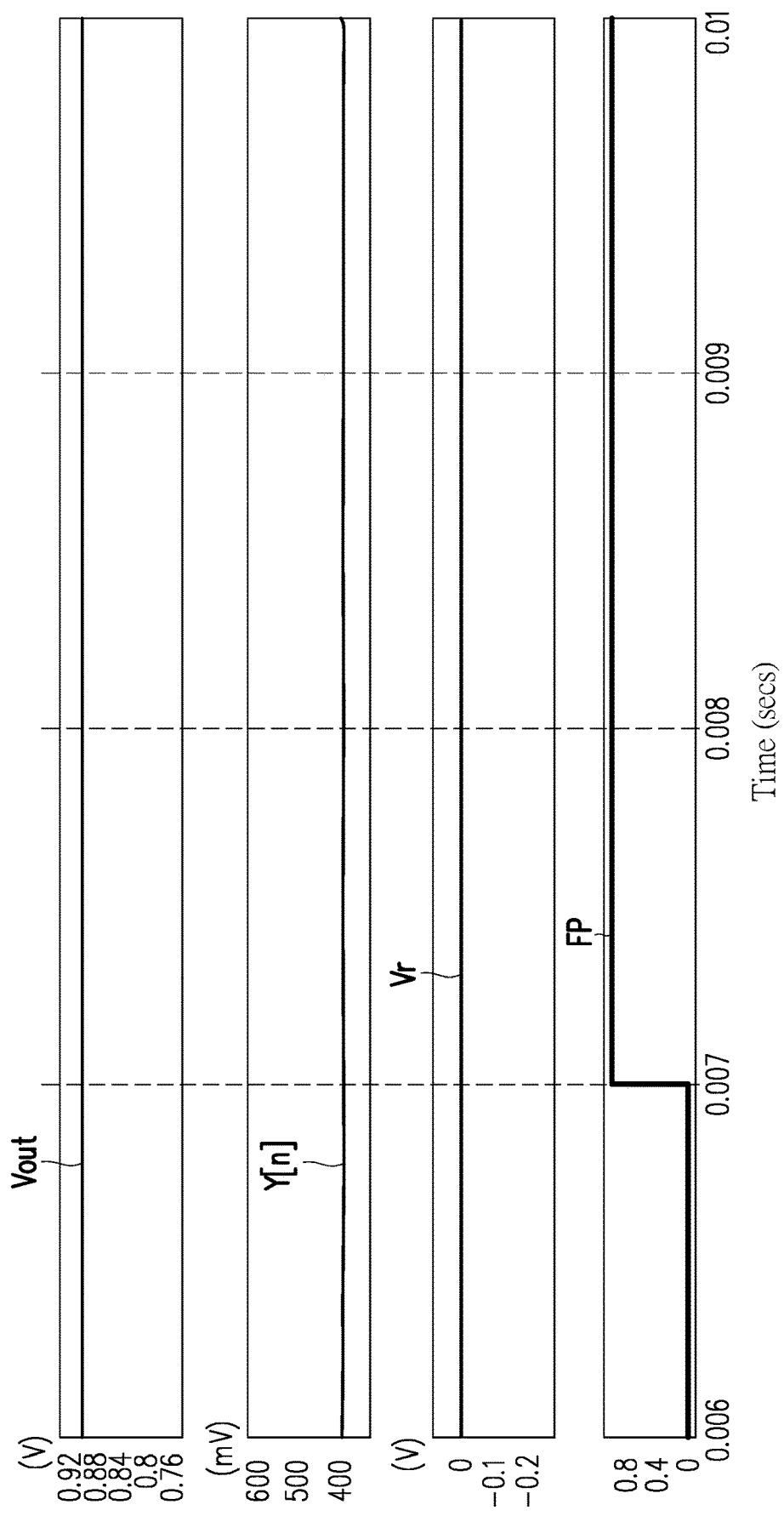
FIG. 5 is a schematic diagram of a simulation of signal and value switching according to an embodiment of the disclosure.
Figure 6:
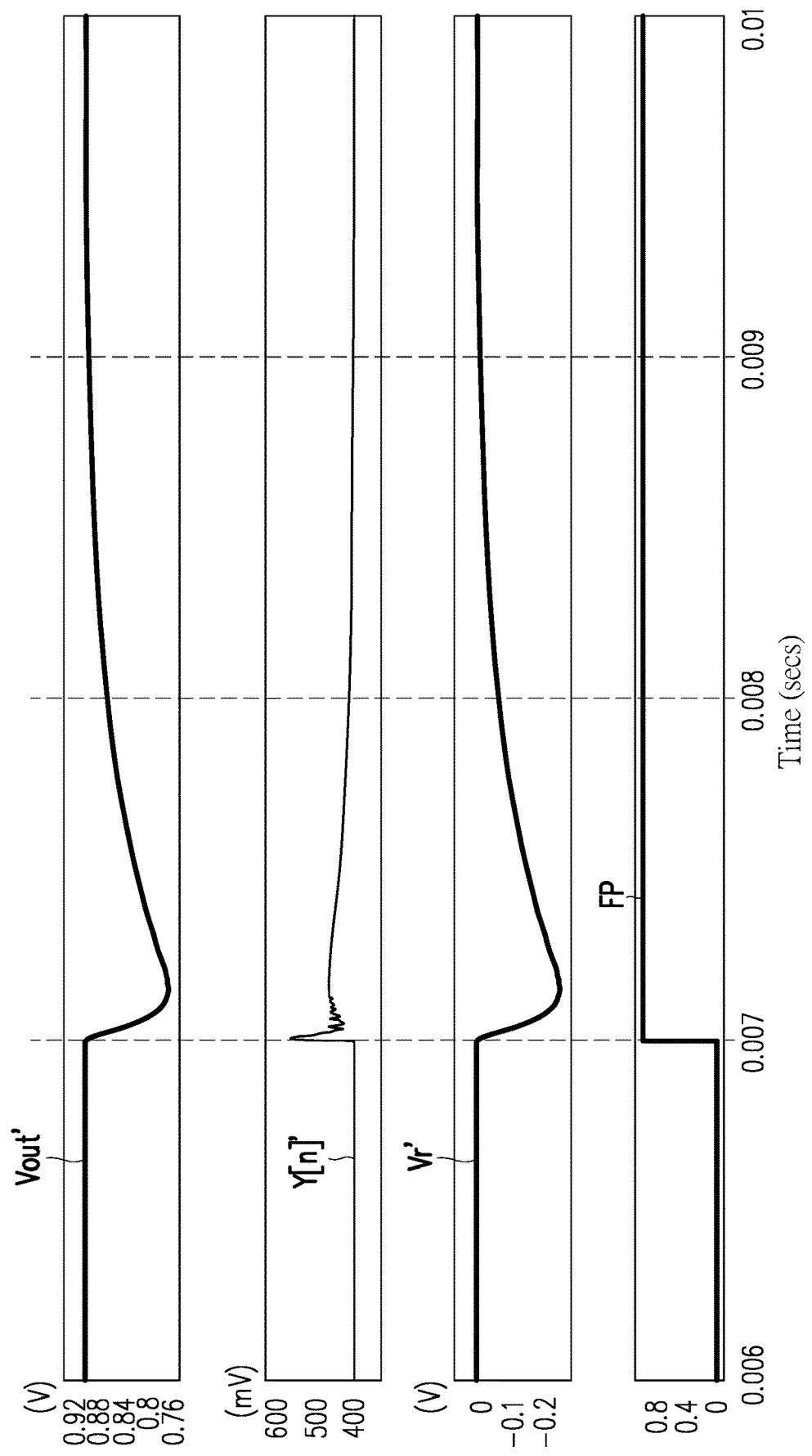
FIG. 6 is a schematic diagram of a simulation of conventional signal and value switching.

Referring to FIG. 5 and FIG. 6 together, FIG. 5 is a schematic diagram of a simulation of signal and value switching according to an embodiment of the disclosure. FIG. 6 is a schematic diagram of a simulation of conventional signal and value switching. Referring to FIG. 5 first, assuming that the controller 111 switches from receiving the first external control command C1 to receiving the second external control command C2 at a time of 0.007 seconds, a command flag FP of the controller 111 is switched, for example, from a value of 0 to a value of 0.8.

In this regard, the computing unit 1113 can quickly perform computations to generate the transition value Pc to the digital filter 112, so that the computing circuit 1121 may keep outputting the digital compensation value Y[n] according to the transition value Pc before and after the time of 0.007 seconds. Therefore, the power converter 100 may stably generate the output voltage Vout before and after the time of 0.007 seconds, and the analog error signal Vr generated by the error amplifier 1141 may be stably maintained at a fixed voltage level.

In contrast, referring to FIG. 6, assuming that a controller of a conventional power converter also switches from receiving the first external control command C1 to receiving the second external control command C2 at the time of 0.007 seconds, the command flag FP of the controller of the conventional power converter is also switched, for example, from the value of 0 to the value of 0.8. Without a compensation control mechanism for generating the transition value Pc by the computing unit 1113 of the disclosure, a digital compensation value Y[n]' received by a digital pulse width signal modulator of the conventional power converter will have level variation after the time of 0.007 seconds and will gradually return to stability after a period of time.

In this way, a voltage level of the output voltage Vout' of the conventional power converter will drop sharply corresponding to changes in the digital compensation value Y[n]' and will gradually return to stability after a period of time, so that a power signal output by the power converter has the issue of signal level variation. In addition, the analog error signal Vr generated by the error amplifier 1141 is also affected to generate a level variation of 0.2 volts, thereby affecting the stability of the control circuit of the power converter. In other words, the control circuit 110 of the power converter 100 of the disclosure can effectively control the power converter 100 to output the power signal stably.

In summary, the control circuit of the power converter and the control method thereof of the disclosure can automatically generate the corresponding transition value according to changes in the external control command, which is provided by the external computing processor. In the case where a power requirement of the system changes, the digital filter can automatically correct a calculation result with the transition value, so the power converter of the disclosure can maintain the stable digital compensation value and output voltage, which can effectively avoid or reduce the case of signal level variation.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A control circuit of a power converter, comprising:
an error amplifying circuit, coupled to an output terminal of the power converter and providing a digital error signal;
a controller, storing a plurality of working parameters, wherein when the controller receives a first external control command, the controller provides a first working parameter corresponding to the first external control command;
a digital filter, coupled to the controller and the error amplifying circuit, and generating a current digital compensation value according to the first working parameter and the digital error signal; and
a digital pulse width signal modulator, coupled to the digital filter and generating a pulse width modulation signal according to the current digital compensation value,
wherein when the controller receives a second external control command, the controller provides a second working parameter corresponding to the second external control command, the controller calculates a transition value according to the second working parameter and the current digital compensation value, and the controller then provides the second working parameter and the transition value to the digital filter,
wherein the controller comprises:
a decoder, receiving the second external control command and generating an indication signal according to the second external control command;
a memory, coupled to the decoder and the digital filter, and storing the working parameters, wherein the memory output one of the working parameters as the second working parameter according to the indication signal; and
a computing unit, coupled to the memory and the digital filter, and calculating the transition value according to the second working parameter and the current digital compensation value.

2. The control circuit according to claim 1, wherein when the controller provides the second working parameter and the transition value to the digital filter for computation, the digital filter outputs the current digital compensation value.

3. The control circuit according to claim 1, wherein the error amplifying circuit comprises an error amplifier and an analog-to-digital converter, the error amplifier is coupled to a reference voltage and the output terminal of the power converter, and the analog-to-digital converter is coupled between the error amplifier and the digital filter.

4. The control circuit according to claim 1, wherein the digital filter comprises:
   a register, coupled to the controller and storing the transition value; and
   a computing circuit, coupled to the register and the controller, and generating the current digital compensation value according to the second working parameter and the transition value.

5. A control method of a power converter, comprising:
   providing a digital error signal through an error amplifying circuit;
   when a controller receives a first external control command, providing a first working parameter corresponding to the first external control command through the controller, wherein the controller stores a plurality of working parameters;
   generating a current digital compensation value according to the first working parameter and the digital error signal through a digital filter;
   generating a pulse width modulation signal according to the current digital compensation value through a digital pulse width signal modulator;
   when the controller receives a second external control command, providing a second working parameter corresponding to the second external control command through the controller;
   calculating a transition value according to the second working parameter and the current digital compensation value through the controller; and
   providing the second working parameter and the transition value to the digital filter through the controller,
   wherein the controller comprises a decoder, a memory, and a computing unit, wherein the step of providing the second working parameter corresponding to the second external control command comprises:
   receiving the second external control command through the decoder, and generating an indication signal according to the second external control command; and
   choosing to output one of the working parameters as the second working parameter according to the indication signal through the memory,
   wherein the step of calculating the transition value comprises:
   calculating the transition value according to the second working parameter and the current digital compensation value through the computing unit.

6. The control method according to claim 5, wherein when the controller provides the second working parameter and the transition value to the digital filter for computation, the digital filter outputs the current digital compensation value.

7. The control method according to claim 5, wherein the error amplifying circuit comprises an error amplifier and an analog-to-digital converter, the error amplifier is coupled to a reference voltage and an output terminal of the power converter, and the analog-to-digital converter is coupled between the error amplifier and the digital filter.

8. The control method according to claim 5, wherein the digital filter comprises a register and a computing circuit, and the register stores the transition value, the control method further comprising:
   keeping generating the current digital compensation value according to the second working parameter and the transition value through the computing circuit.

* * * * *